Patented Dec. 5, 1950

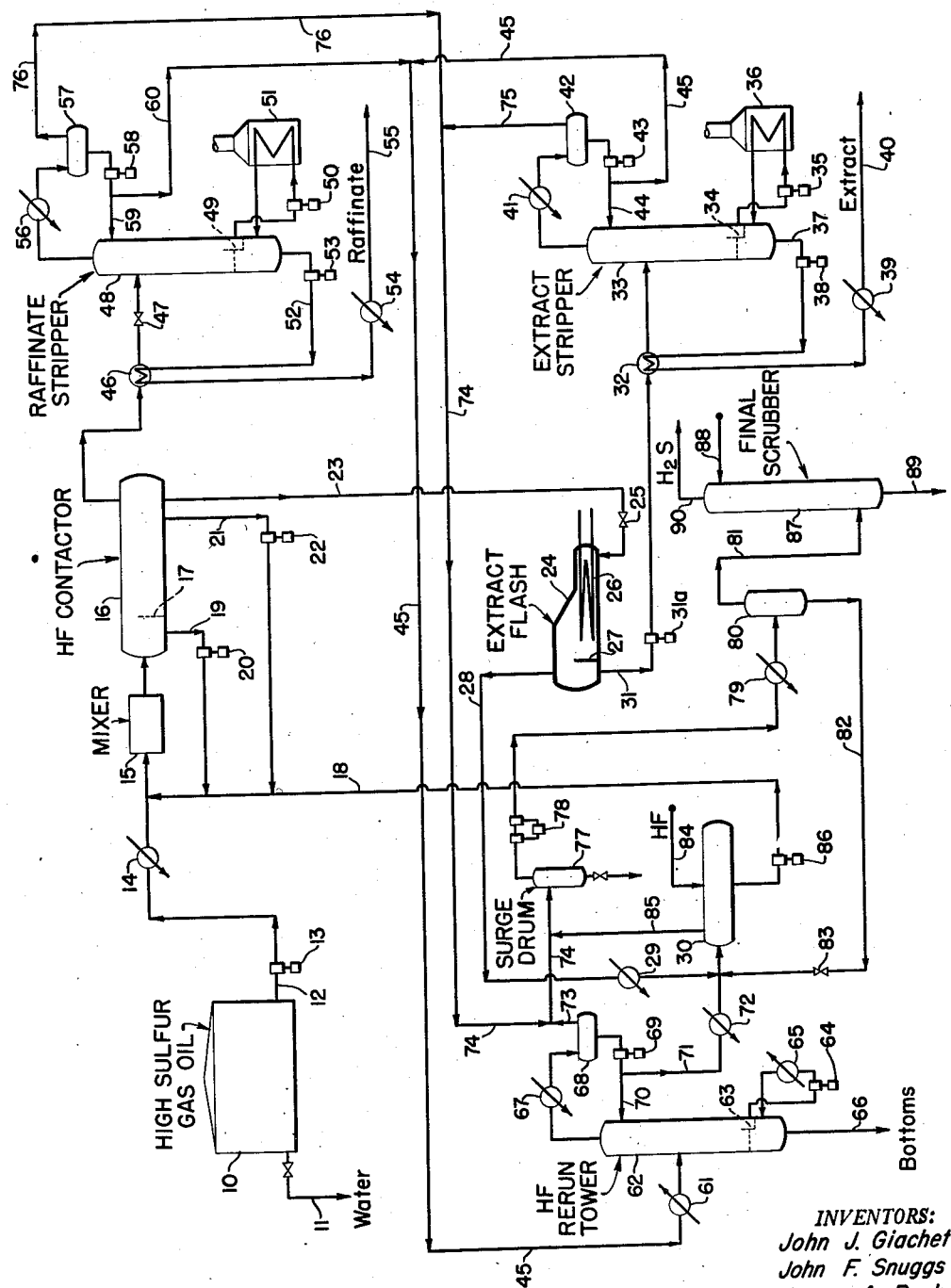

2,532,492

UNITED STATES PATENT OFFICE 2,532,492

HF EXTRACTION OF HIGH SULFUR GAS OIL

John J. Giachetto, Calumet City, and John F. Snuggs, Chicago, Ill., and James A. Bock, Hammond, Ind., assignors to Standard Oil Company, Chicago, Ill., a corporation of Indiana Application August 25, 1948, Serial No. 46,154

13 Claims. (Cl. 196—31)

This invention relates to hydrogen fluoride extraction of high sulfur gas oil and it pertains more particularly to improved commercial methods and means for desulfurizing catalytic cracking charging stock.

An object of the invention is to provide an improved large scale unit at minimum capital investment and operating cost. A further object is to provide a unit of maximum safety, simplicity, flexibility, and ease of control. A further object is to provide improved method and means for eliminating hydrogen sulfide from the system. A further object is to utilize the hydrogen fluoride itself as a dehydrating agent in the system and to provide improved methods and means for eliminating water and hydrogen sulfide from the recycled hydrogen fluoride stream. Other objects will be apparent as the detailed description of the invention proceeds.

It has been found that remarkable savings may be effected in large scale commercial operations by avoiding the use of expensive charging stock drying steps heretofore deemed necessary and by handling the hydrogen fluoride in the system in such a manner as to eliminate water and hydrogen sulfide therefrom before recycling. Considerable flexibility and ease of operation and control are accomplished by employing, instead of conventional packed countercurrent extracting towers, a simple mixer and settler provided with recycling means. Considerable savings are effected in the cost of extract stripping by the use of a relatively low temperature, low pressure hydrogen fluoride flash drum for recovering the bulk of the hydrogen fluoride; hydrogen fluoride removal at this stage makes possible great savings in the extract stripping and water removal systems.

An important feature of the invention is the method and means for removing $H_2S$ from the system. Some $H_2S$ may be formed in the extraction step itself, additional $H_2S$ may be formed and/or released in the hydrogen fluoride flash zone and still further amounts of $H_2S$ may be formed in the raffinate and extract strippers. From the standpoint of both safety and economics, it is necessary that this $H_2S$ be removed from the system without carrying with it any appreciable amount of HF. All receivers in which $H_2S$ may accumulate are provided with gas vent lines which lead through one or more collector lines to a vapor surge drum. This surge drum not only accumulates gas which is to be supplied to the compressor inlet but it also functions as a liquid separator or trap for the removal of any liquids which may be carried by entrainment or otherwise with the vented gas streams. Gas from the surge drum is then compressed to about 100 to 300 p. s. i. g., e. g. about 120 p. s. i. g., the compressed gases are cooled to ordinary condenser water temperature and the $H_2S$ is then separated as a gas from liquefied HF so that the latter may be returned to the system. As a final precautionary measure the vented $H_2S$ may be scrubbed with suitable solvent and/or may be neutralized with caustic but the cost of removing final HF traces is relatively small since the bulk of the HF is separated by simple compression-condensation.

The invention will be more clearly understood from the following detailed description read in conjunction with the accompanying drawing which is a diagrammatic flow sheet schematically illustrating a 50,000 barrel per day unit for extracting high sulfur gas oil with HF.

While it has long been known that hydrocarbon oils could be desulfurized with HF and that such desulfurization is particularly advantageous for the preparation of catalytic cracking charging stocks, no commercial use has heretofore been made of such extraction process largely because of the enormous investment and operating costs which have heretofore been deemed necessary. Also the precise nature of the reactions involved in HF extraction of high sulfur gas oils has not been fully understood and the problems presented thereby were not fully appreciated. HF extraction of high sulfur gas oils is not a simple matter of relative solubilities of various components but it involves certain chemical reactions which do not occur in ordinary solvent extraction processes. For example, two mercaptans may undergo oxidation with dissolved oxygen to form a disulfide and water; this water must be removed or it will cause undue dilution of recycled HF. Disulfides react to give thioethers, $H_2S$ and free sulfur. Two mercaptans may react to give a thioether and $H_2S$. Sulfur compounds may react with cyclic compounds to give alkyl aromatics and $H_2S$. Thiophene may react to give an infusible resin plus $H_2S$. While no novelty is claimed herein as to any of these chemical reactions, a commercial process must necessarily take them into account and this invention relates to such a process.

A preferred example of the invention is a commercial unit for handling 50,000 barrels per stream day (651,500 pounds per hour) of a high sulfur gas oil of about 27° A. P. I. gravity and containing about 2.11 weight percent of total sulfur. Such charging stock is accumulated and allowed to settle in storage tank 10 in order that the bulk of the water may be removed therefrom by line 11. The use of conventional bauxite dryers or the use of distillation for removing moisture adds enormously to the cost of the plant and such expedients have been found to be economically unfeasible since any water not removable by simple settling can be eliminated from the system with only a small loss of HF. In this system the HF is employed as a dehydrating as well as an extraction medium.

After removal of all water which can readily be settled, the charge is introduced through line 12 by pump 13 through heat exchanger 14 and mixer 15 to HF contactor 16 which may be provided with an internal baffle 17. Such contactor is about 12 feet in diameter and about 42 feet in length. HF is introduced from the HF surge drum 30 into mixer 15 through line 18 in amounts of approximately 200,000 pounds per hour. The intimacy of contact may be augmented by recycling HF-oil emulsion through line 19 by circulating pump 20 and/or by recycling a portion of the settled HF layer through line 21 by pump 22. The HF contactor is preferably operated at about 40 to 120 p. s. i. g., e. g. at about 85 p. s. i g. and at a temperature of about 80 to 150° F., e. g. about 120° F.

The net (unrecycled) HF-extract material is withdrawn through line 23 to chamber 24 which is a combination heat exchanger and flash drum and which operates at a pressure of about 5 to 30, e. g. about 20 p. s. i. g. and a temperature of about 120° F., a pressure reducing valve 25 being employed if the pressure drop in line 23 is not sufficient. The flash chamber is provided with steam heater 26 and a baffle 27 for maintaining the desired liquid level around the heating coils. About 188,000 pounds per hour of HF can thus be separated from the HF-extract at minimum cost with relatively inexpensive equipment, the HF vapors being withdrawn through line 28 and water cooled condenser 29 to HF storage or accumulator drum 30.

The unvaporized portion of the HF-extract material is withdrawn from the base of flash chamber 24 through line 31 by pump 31a and introduced through heat exchanger 32 to the upper part of extract stripper 33 which is preferably operated at a top temperature of about 120° F. and a bottom temperature of about 600 to 650° F., e. g. about 620° F., and at a pressure of about 25 p. s. i. g. Liquid from trapout plate 34 is circulated by pump 35 to a fired heater 36 for maintaining the desired stripper bottom temperature. Stripper extract material is withdrawn through line 37 by pump 38, passed through heat exchanger 32, then through cooler 39 and finally discharged to storage through line 40.

Overhead from stripper 33 is condensed in cooler 41 and introduced into receiver 42. Condensate is withdrawn from this receiver by pump 43 and a portion returned through line 44 as reflux in tower 33 while the remainder is withdrawn through line 45.

The raffinate or HF-insoluble layer from the settling section of contactor 16 (which layer contains only about 3% of the total introduced HF) is passed through heat exchanger 46 and pressure reducing valve 47 to the upper part of raffinate stripper 48 which also operates at about 25 p. s. i. g. with a top temperature of about 120° F. but its bottom temperature is maintained at about 550 to 600° F., e. g. about 575° F., by withdrawing liquid from trapout plate 49 and circulating it by pump 50 through fired heater 51.

The stripped raffinate is withdrawn through line 52 by pump 53 and passed through heat exchanger 46 and cooler 54 before being discharged to storage or to a catalytic cracking charging system through line 55.

The overhead from stripper 48 is condensed in cooler 56 and collected in receiver 57 from which condensate is removed by pump 58, a portion of it being recycled through line 59 for use as reflux in tower 48 while the remainder is withdrawn through line 60 to line 45.

To eliminate water which is introduced into the system with charging stock, which is formed in the contacting or stripping steps by chemical reaction, and which may enter the system on account of steam and cooling water leakage, the HF streams from receivers 42 and 57 are introduced through line 45, through heater 61 to rerun tower 62 which is operated at a top temperature of about 118° F. and a bottom temperature of about 260° to 300° F., e. g. about 280° F., under a pressure of about 23 p. s. i. g. Operation of the tower at lower pressure will of course require lower temperature and would require refrigeration in 67. Liquid from a bottom trapout tray 63 is circulated by pump 64 through a steam heated exchanger 65 for maintaining the desired rerun tower bottom temperature. An HF-water azeotrope is withdrawn from the base of tower 62 through line 66 and either utilized in known manners or neutralized and discarded.

The overhead from the rerun tower is condensed in cooler 67 and introduced into receiver 68 from which condensate is withdrawn by pump 69, a part of it being introduced through line 70 for use as reflux in tower 62 and the remainder withdrawn through line 71 and cooler 72 to HF storage drum 30.

Some $H_2S$ will dissolve in the HF streams. Any $H_2S$ dissolved or entrained in HF introduced into the rerun tower may be removed from the top of receiver 68 by vent line 73 which leads to a common $H_2S$ line 74. Similarly receiver 42 is provided with an $H_2S$ vent line 75 discharging into common $H_2S$ line 74 and receiver 57 is provided with a vent line 76 discharging into common $H_2S$ line 74. Ordinarilly there is no tendency for $H_2S$ accumulation in contactor 16 but if $H_2S$ should accumulate therein a vent line (not shown) is also provided for this contactor to common $H_2S$ line 74. $H_2S$ line 74 leads to drum 77 which discharges to the inlet of a multi-stage compressor 78 which boosts the pressure of said gas to about 100 to 300 p. s. i. g., for example about 125 p. s. i. g. Any entrained or condensed liquid may be removed from the base of the drum and the compressor charge may be taken from the top of said drum. The compressed gas is cooled to a temperature obtainable by available cooling water in cooler 79 and introduced into separating drum 80 from which $H_2S$ is vented by line 81 and condensed HF is recycled through line 82 and pressure reducing valve 83 to HF storage drum 30. Makeup HF is introduced into storage drum 30 by line 84, the required amounts in this case being of the order of about 500 to about 1000 pounds per hour. The storage drum is also provided with a vent line 85 which leads to the common $H_2S$ line 74. Liquid HF is withdrawn from the bottom of the storage drum by pump 86 and thence discharged through line 18 as hereinabove described. In this particular design the raffinate stripper may be a tower about 7 by 60 feet with approximately 10 trays while the extract stripper may be a tower about 5 by 42 feet with about the same number of trays.

The combination heat-exchanger-flash chamber contributes to a remarkable extent in minimizing investment and operating costs, increasing run lengths, and in providing greater flexibility of operation. Upwards of 90% of the HF introduced through line 13, i. e. of the HF used as treating agent, is inexpensively recovered in substantially pure state. This not only makes possible the use of a small extract stripper but also, since substantially all of the water remains in the extract flash liquid, it makes possible the use of a small HF rerun tower for water removal. This is of great importance because HF-water rerun equipment would be a very expensive item in total plant cost (on account of the required corrosion protection) if all of the recycled HF had to be re-run for water removal. The removal of the bulk of the HF from the extract before stripping markedly decreases coking and fouling of extract stripper reboiler equipment. It also decreases $H_2S$ formation in the raffinate stripper.

With regard to the rerun tower it should be pointed out that such equipment would be necessary even if a preliminary charging stock dehydration step were employed and substantial savings are effected by eliminating the initial dehydrating step and merely employing a rerun tower which in this case may be about 3 feet by 25 feet with approximately 7 trays. The contactor is adequate for obtaining the necessary intimacy of mixing because the required contact time is short. For this purpose however it should be understood that other contactors conventionally employed in alkylation units may be suitable for use in this extraction system.

The feature of a common collecting line for $H_2S$ and the recovery of HF from such collected gas is of considerable importance not only from the safety standpoint but because there is a marked economic saving. Residual amounts of HF may be removed from vented $H_2S$ by selective solvents in scrubber 87, the solvent being introduced by line 88 and withdrawn by line 89 while the scrubbed gas is withdrawn by line 90. A neutralizing agent may be thus employed instead of a solvent.

With some charging stocks small amounts of light and/or normally gaseous hydrocarbons may be formed at the temperatures employed in the raffinate and extract stripper although usually the amount of cracking is negligible and no provision must be made for light hydrocarbon removal. Any relatively uncondensible hydrocarbons thus formed of course will be vented with $H_2S$ from line 99. If condensible hydrocarbons are formed they may be separately withdrawn from receivers 42 and 57.

The high temperatures which prevail at the base of the raffinate and extract strippers are usually sufficient to decompose any HF-oil adduct which may be formed and to give a raffinate and extract of such low fluorine content as to require no subsequent treatment. When necessary or desirable of course bauxite treaters or other known means may be employed for still further reducing the fluorine or combined fluorine content of the products.

The plant hereinabove described is designed to obtain a raffinate yield of 83.2%, i. e. about 41,600 barrels per stream day, such raffinate having an A. P. I. gravity of about 30.6° and a sulfur content of about .8 weight percent while the extract has an A. P. I. gravity of about 10° and a sulfur content of about 7.6%. The remarkable advantages obtainable by using raffinate instead of unextracted charging stock in the case of fluid catalytic cracking of a mixture of West Texas virgin and coke still gas oils is illustrated by the following table:

|  | Unextracted | Raffinate |
|---|---|---|
| Cracking Charge, B/D | 30,000 | 35,000 |
| Cracking Temperature, °F | 900 | 870 |
| Coke Burned, Lbs./Hr | 18,500 | 18,300 |
| Conversion, Vol. Per Cent | 48 | 51 |
| Gasoline, B/D | 12,250 | 16,100 |
| Octane No., C. F. R. M.+1 cc. tel | 81.5 | 82 |
| Octane No., C. F. R. R.+1 cc. tel | 95 | 95 |
| Weight Per Cent S | 0.18 | 0.05 |
| Excess Butanes, B/D | 1,900 | 2,500 |
| Dry Gas, MMCF/D | 7.4 | 4.85 |
| Light Cycle, B/D | 9,500 | 9,800 |
| Burning Quality Index | 15 | 52 |
| Weight Percent S | 1.4 | 0.8 |

From the above description it will be seen that we have accomplished the objects of our invention. While the invention is primarily directed to the extraction of a high sulfur gas oil it should be understood that it is applicable to the processing of other high sulfur charging stocks of petroleum origin and/or from shale oil.

Examples of charging stocks and yields obtainable therefrom in semi-commercial scale operations with a contacting temperature of about 100° F. and with approximately 30 volume percent hydrogen fluoride external solvent ratio are shown by the following table:

|  | Naphtha | Heater Oil | Light Gas Oil | Wide Cut Gas Oil | Coke Still Gas Oil | Catalytic Cracking Light Cycle Gas Oil |
|---|---|---|---|---|---|---|
| *Charging Stock* | | | | | | |
| °API Gravity | 49.9 | 40.3 | 31.5 | 31.5 | 27.1 | 29.3 |
| 50% pt., °F | 294 | 430 | 575 | 586 | 625 | 492 |
| Wt. percent S | 0.32 | 0.83 | 1.46 | 1.55 | 1.64 | 1.07 |
| *Raffinate* | | | | | | |
| Yield, Vol. percent | 98.5 | 95.0 | 89.4 | 88.3 | 81.5 | 84.3 |
| Wt. percent S | 0.02 | 0.12 | 0.48 | 0.56 | 0.48 | 0.11 |

The amount of hydrogen fluoride required (as well as other processing conditions) may vary somewhat with particular charging stocks but is usually within the range of about 10 to 50 volume percent. The nature of the extracts is of course dependent upon the nature of the charging stock, amount of solvent used and on treating conditions. Extracts usually have an A. P. I. gravity in the range of 2° to 15° and a sulfur content of about 4 to 12%.

Generally speaking, carbon steel is a satisfactory material of construction except in locations where HF is encountered at temperatures above about 200 to 250° F., where the concentration of water in HF is above 10% and where $H_2S$ is concentrated. Corrosion resistant alloys such as Monel are employed in raffinate and extract stripper preheaters and as linings for the upper section of the stripper towers. A corrosion resistant metal such as copper is employed for the HF rerun tower and auxiliaries. Inconel is an example of an alloy which can be used as protection for the $H_2S$ recovery equipment.

We claim:
1. In a process for extracting a sulfur-containing hydrocarbon charging stock with hydrogen fluoride which includes the steps of contacting the charging stock with hydrogen fluoride in amounts and under conditions including a contacting temperature in the range of 80° to 150° F. for forming separate liquid phases, separately stripping each of said phases for removing hydrogen fluoride therefrom and dehydrating and recycling removed hydrogen fluoride, in which process H₂S tends to accumulate at a plurality of places, the improved method of operation which comprises removing streams of H₂S from the places at which it tends to accumulate, combining the removed H₂S streams to form a single gas stream, compressing said gas stream, cooling the compressed stream and removing hydrogen fluoride from said stream after said cooling step.

2. The method of claim 1 wherein the hydrogen fluoride removal is effected chiefly by a physical gas-liquid separation.

3. The method of claim 1 wherein the hydrogen fluoride removal is effected chiefly by a physical gas-liquid separation and wherein residual amounts of hydrogen fluoride are removed from separated gas by contact with a neutralizing agent.

4. A process for the extraction of a sulfur containing hydrocarbon charging stock with hydrogen fluoride which comprises separating from a large mass of said charging stock any water which is separable therefrom by settling, then intimately contacting said charging stock with hydrogen fluoride in amounts and under conditions including a contacting temperature in the range of 80° to 150° F., for separating a raffinate phase which contains only a small amount of hydrogen fluoride from an extract phase which contains the bulk of the hydrogen fluoride, stripping hydrogen fluoride from the raffinite phase, introducing the extract phase into a flash separation zone and removing most of the hydrogen fluoride from said extract phase therein at a temperature sufficiently low to prevent removal of any substantial amount of water with the removed hydrogen fluoride, stripping the extract from which the bulk of the hydrogen fluoride has thus been removed, dehydrating hydrogen fluoride removed in the stripping steps and combining it with hydrogen fluoride removed in the flash separation step, recycling combined hydrogen fluoride to the contacting step, collecting hydrogen sulfide which is liberated in the process and removing hydrogen fluoride from said collected hydrogen sulfide before discharging it from the process.

5. The process of claim 4 wherein the removal of hydrogen fluoride from collected hydrogen sulfide is effected chiefly by compression, cooling and physical gas-liquid separation.

6. A process for extracting a hydrocarbon charging stock boiling chiefly within the gas oil boiling range and containing at least about 1% of total sulfur which process comprises continuously introducing charging stock into a contacting zone along with an amount of hydrogen fluoride in the range of about 10 to 50 volume percent, obtaining intimate contact between the hydrogen fluoride and charging stock at a temperature in the range of about 80 to about 150° F. and under a pressure in the range of about 70 to 100 p. s. i. g. whereby separate raffinate and extract liquid phases are produced, stripping said raffinate phase in a stripping zone with a top temperature of about 120° F. and a bottom temperature in the range of about 550 to 600° F. at a pressure of about 20 p. s. i. g., collecting stripped overhead in a first receiving zone, introducing extract phase from the contacting zone to a flash zone and removing most of the hydrogen fluoride from said phase therein at a temperature sufficiently low to avoid removal of water with the removed hydrogen fluoride, condensing vaporized hydrogen fluoride from the flash zone and introducing it into an accumulation zone, stripping unvaporized liquid from the flash zone in an extract stripping zone operated at a top temperature of about 120° F., a bottom temperature in the range of about 600 to 650° F., and a pressure of about 20 p. s. i. g., collected overhead from said extract stripping zone in a second receiving zone, withdrawing liquid hydrogen fluoride from said receiving zones to a water elimination distillation zone, withdrawing the overhead from said distillation zone into a third receiving zone, introducing anhydrous liquid hydrogen fluoride from said third receiving zone into said accumulation zone, collecting gas from each of said receiving zones and compressing said collected gas, cooling said compressed gas to effect condensation of hydrogen fluoride contained therein, separating condensed hydrogen fluoride from uncondensed gas and introducing said last-named separated hydrogen fluoride to said accumulation zone and introducing hydrogen fluoride from said accumulation zone to said contacting zone.

7. The process of claim 6 which includes the step of recycling unseparated charging stock and hydrogen fluoride from the contacting zone back to the contacting zone.

8. The process of claim 6 which includes the step of recycling extract from said contacting zone back to said contacting zone.

9. The process of claim 6 which includes the step of removing residual hydrogen fluoride from said uncondensed gas.

10. In a process for treating a sulfur- and water-containing hydrocarbon oil with liquid hydrogen fluoride, which process comprises contacting said oil with liquid hydrogen fluoride and thereafter separating a partially desulfurized raffinate and an extract layer comprising hydrogen fluoride, sulfur compounds and water, the improvement which comprises vaporizing and separately recovering from said extract layer a stream of hydrogen fluoride substantially free of water and recycling hydrogen fluoride so derived to said process, thereafter subjecting the extract layer to thermal decomposition to produce a vapor comprising hydrogen fluoride, water and hydrogen sulfide, subjecting said vapor to fractional condensation to produce a second vapor comprising hydrogen fluoride and hydrogen sufide and a condensate containing water and hydrogen fluoride in excess of the amount of hydrogen fluoride in the azeotropic hydrogen fluoride-water composition, fractionally distilling said condensate to produce an azeotrope of hydrogen fluoride and water as a bottoms fraction and a substantially anhydrous hydrogen fluoride distillate, recycling the last named distillate to said process, fractionating said second vapor comprising hydrogen fluoride and hydrogen sulfide to produce a second condensate consisting essentially of liquid hydrogen fluoride and recycling said second condensate to said process.

11. The process of claim 10 wherein said hydrocarbon oil is a gas oil.

12. A process for extracting a hydrocarbon charging stock boiling chiefly within the gas oil boiling range and containing at least about 1 per cent of total sulfur, which process comprises continuously introducing said charging stock into a contacting zone, continuously introducing hydrogen fluoride into the contacting zone in an amount in the range of about 10 to 50 volume per cent based on the charging stock, obtaining intimate contact between the hydrogen fluoride and the charging stock in the contacting zone at a temperature in the range of about 80° to 150° F. and under a pressure in the range of about 70 to 100 p. s. i. g. whereby separate raffinate and extract liquid phases are produced without appreciable gas formation, stripping said raffinate phase in a stripping zone at least a part of which is at sufficiently high temperature to effect hydrogen sulfide production, passing overhead from the stripping zone through a cooling zone to a first receiving zone, introducing the extract phase from the contacting zone to a flash zone and removing most of the hydrogen fluoride in substantially anhydrous condition from said phase in said flash zone, stripping unvaporized liquid from the flash zone in an extract stripping zone, at least a part of which is at sufficiently high temperature to effect liberation of hydrogen sulfide, passing overhead from the extract stripping zone to a second cooling zone to a second receiving zone, introducing liquid hydrogen fluoride from at least one of said receiving zones to a water elimination distillation zone, combining gas removed from the first receiving zone with gas removed from the second gas receiving zone, compressing said combined gas streams, cooling the compressed gas streams, separating condensed hydrogen fluoride from the cooled compressed stream and scrubbing the uncondensed, cool, compressed gases to separate hydrogen fluoride from hydrogen sulfide.

13. A system for extracting a high sulfur gas oil with hydrogen fluoride which system comprises a contactor, lines for introducing hydrogen fluoride and charging stock into said contactor, a raffinate stripper, a line for introducing raffinate from the contactor to the stripper, a condenser and receiver and a line leading from the top of the raffinate stripper to said condenser to said receiver, a heater connected to the base of the raffinate stripper and a line for removing the raffinate from the stripper, a HF rerun tower, one line for returning condensate from the receiver to the top of the raffinate stripper and another line for introducing condensate from the receiver to the rerun tower, an extract flash vessel provided with a heater, a line for conducting extract from the contactor to the flash chamber, an extract stripper, a line for conducting liquid from the flash vessel to the stripper, a second condenser and a second receiver, a line for conducting overhead from the extract stripper to the second condenser to the second receiver, a line for returning condensate from the second receiver to the extract stripper, and another line for introducing condensate from the second receiver to said rerun tower, a heater connected to the base of the extract stripper, a line for removing extract from the base of the stripper, a third condenser and a third receiver, a line for conducting overhead from the top of the rerun tower to the third condenser to the third receiver, an HF storage vessel, a line for returning liquid from the third receiver to the rerun tower, a line for introducing liquid from the third receiver to the HF storage vessel, a line for introducing HF from the extract flash vessel through a cooler directly to the HF storage vessel, a surge drum, lines leading to said surge drum from at least two of said receivers and from said HF storage vessel, a line for withdrawing condensate from said surge drum, a gas compressor, cooler and separator, and a line for conducting gases from said surge drum to said compressor and thence through said cooler to said separator, a line for conducting liquid from said separator to said HF storage vessel, a gas scrubber, and a line for introducing gas from said separator to said scrubber.

JOHN J. GIACHETTO.
JOHN F. SNUGGS.
JAMES A. BOCK.

REFERENCES CITED

The following references are of record in the file of this patent:

UNITED STATES PATENTS

| Number | Name | Date |
|---|---|---|
| 2,434,040 | Hartman | Jan. 6, 1948 |
| 2,449,463 | Evering et al. | Sept. 14, 1948 |
| 2,450,588 | Evering et al. | Oct. 5, 1948 |